(12) United States Patent
De Saulles et al.

(10) Patent No.: US 10,070,717 B2
(45) Date of Patent: Sep. 11, 2018

(54) STOWABLE TABLE ASSEMBLY

(71) Applicant: FORD MOTOR COMPANY LIMITED, Brentwood (GB)

(72) Inventors: Stephen De Saulles, London (GB); Liberty Fearns, London (GB); Marcus Hoggarth, Hertfordshire (GB); Matthew Graeme Leck, Ruislip (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/365,176

(22) Filed: Nov. 30, 2016

(65) Prior Publication Data
US 2017/0181536 A1 Jun. 29, 2017

(30) Foreign Application Priority Data
Dec. 23, 2015 (GB) .................................. 1522757.2

(51) Int. Cl.
*A47B 3/00* (2006.01)
*A47B 17/00* (2006.01)

(52) U.S. Cl.
CPC ............... *A47B 3/00* (2013.01); *A47B 17/00* (2013.01)

(58) Field of Classification Search
CPC .. A47B 3/00; A47B 3/04; A47B 17/00; A47B 1/06; A47B 1/08; A47B 2220/0013; A47B 5/00; A47B 83/045
USPC .... 108/42, 44, 48, 137, 138, 67, 68, 33, 40; 296/24, 44, 100.09, 100.12; 312/297, 312/277, 241, 317.1, 317.3; 160/36, 37
See application file for complete search history.

(56) References Cited

U.S. PATENT DOCUMENTS

| | | | |
|---|---|---|---|
| 228,066 A * | 5/1880 | Hayden | A47B 1/06 108/68 |
| 472,881 A * | 4/1892 | Homer et al. | A47B 1/06 108/68 |
| 492,284 A * | 2/1893 | Graaff et al. | A47B 1/06 108/68 |

(Continued)

FOREIGN PATENT DOCUMENTS

| | | | |
|---|---|---|---|
| DE | 19935762 | * | 2/2001 |
| EP | 0778174 A1 | | 6/1997 |

(Continued)

OTHER PUBLICATIONS

English Machine Translation of EP0778174A1.

*Primary Examiner* — Janet M Wilkens
(74) *Attorney, Agent, or Firm* — Vichit Chea; King & Schickli, PLLC (57) ABSTRACT

A stowable table assembly includes: a table portion rotatable between a deployed position and a stowed position; a carrier configured to be slidably received in a recess; and a plurality of elongate members provided between the table portion and the carrier. Each of the elongate members has a wedge-shaped cross-section such that the elongate members comprise side surfaces that taper towards each other from an upper surface to an underside surface of the elongate members. A first elongate member is coupled to the table portion and a last elongate member is coupled to the carrier. The elongate members are movably coupled to one another such that the side surfaces of neighboring elongate members abut when the table portion is in the deployed position.

20 Claims, 7 Drawing Sheets

(56) References Cited

U.S. PATENT DOCUMENTS

| | | | | |
|---|---|---|---|---|
| 508,938 A * | 11/1893 | Hamilton | A47B 5/06 | 108/130 |
| 542,139 A * | 7/1895 | Brodin | A47B 1/06 | 108/68 |
| 963,502 A * | 7/1910 | Bond | A47B 1/06 | 108/68 |
| 1,566,200 A * | 12/1925 | Giard | A47B 3/04 | 108/68 |
| 1,950,927 A * | 3/1934 | McMillan | B60N 2/6009 | 108/68 |
| 1,980,659 A * | 11/1934 | Boldt | B42D 19/00 | 281/9 |
| 2,262,719 A * | 11/1941 | Collins | H01H 3/16 | 160/209 |
| 2,726,911 A * | 12/1955 | Mason | A47B 1/06 | 108/68 |
| 2,771,319 A * | 11/1956 | Renquist | B60J 7/068 | 160/231.1 |
| 2,778,698 A * | 1/1957 | Gaylord | A47B 1/06 | 108/33 |
| 2,848,291 A * | 8/1958 | Edelson | A47B 1/06 | 108/50.17 |
| 2,869,956 A * | 1/1959 | Gaines | A47B 83/045 | 108/93 |
| 2,909,718 A * | 10/1959 | Lawick | E05F 15/43 | 160/188 |
| 3,129,752 A * | 4/1964 | Whiting | B60J 5/14 | 160/191 |
| 3,299,570 A * | 1/1967 | Radcliffe | E04F 10/00 | 160/32 |
| 3,884,159 A * | 5/1975 | Faria | A47B 3/00 | 108/168 |
| 4,795,206 A * | 1/1989 | Adams | B60J 5/14 | 160/201 |
| 5,065,808 A * | 11/1991 | Hopperdietzel | E06B 9/115 | 160/229.1 |
| 5,277,240 A * | 1/1994 | Epema | B60J 5/08 | 160/188 |
| 5,797,666 A * | 8/1998 | Park | A47B 21/0073 | 312/223.3 |
| 6,305,456 B1 * | 10/2001 | Sanchez | E06B 9/74 | 160/188 |
| 6,733,094 B1 * | 5/2004 | Chang | A47B 21/0073 | 312/306 |
| 7,836,832 B2 * | 11/2010 | Boyd | A47B 3/04 | 108/143 |
| 8,205,563 B2 * | 6/2012 | St. Louis | B64D 11/00 | 108/40 |
| 8,348,080 B2 * | 1/2013 | Baptiste | B65F 1/1468 | 160/37 |
| 2006/0225624 A1 * | 10/2006 | Grace | A47B 3/002 | 108/26 |
| 2012/0133254 A1 * | 5/2012 | Chupp | A47B 1/06 | 312/205 |
| 2016/0331125 A1 * | 11/2016 | Banks | A47B 5/006 | |

FOREIGN PATENT DOCUMENTS

| | | | |
|---|---|---|---|
| FR | 1427200 | * | 2/1966 |
| FR | 1430011 | * | 2/1966 |
| FR | 1515259 | * | 3/1968 |
| WO | 2011146554 A | | 11/2011 |

* cited by examiner

STOWABLE TABLE ASSEMBLY

TECHNICAL FIELD

This disclosure relates generally to a stowable table assembly and particularly, although not exclusively, relates to a stowable table assembly comprising one or more wedge-shaped members provided at a proximal end of a table portion.

BACKGROUND

It is known to provide stowable tables that move between a horizontal position in which the table may be used and a vertical position in which the table may be stored. Such tables may be moved between the two positions manually or by virtue of an actuator. In the case of the table being moved by an actuator, the torque required to rotate the table can be high and it can be difficult to move the table in a controlled manner.

SUMMARY

According to an aspect of the present disclosure, there is provided a stowable table assembly comprising:
  a table portion rotatable between a deployed position and a stowed position;
  a carrier configured to be slidably received in a recess; and
  a plurality of elongate members provided between the table portion and the carrier, each of the elongate members having a wedge-shaped cross-section such that the elongate members comprise side surfaces that taper towards each other from an upper surface to an underside surface of the elongate members, a first elongate member being coupled to the table portion and a last elongate member being coupled to the carrier,
  wherein the elongate members are movably coupled to one another such that the side surfaces of neighbouring elongate members abut when the table portion is in the deployed position.

The stowable table advantageously deploys or stows in a smooth and gradual manner. Such a gradual movement may be pleasing to the eye. Furthermore, if a rotating cup holder is provided at a distal end of the table portion (e.g. with an axis of rotation parallel to a longitudinal axis of the elongate members), the cup holder may gradually rotate, thereby avoiding any spillage of a liquid held in the cup holder. A linear force may also be applied to the carrier portion to move the table portion between the two positions and such a force may be more readily applied and controlled.

An interaction between an edge of an opening to the recess and the underside surfaces of the elongate members may cause the table portion to move from the deployed position to the stowed position as the carrier is retracted into the recess.

The edge of the recess opening may be formed from a low friction material. Alternatively, the edge of the recess opening may comprise a roller.

The stowable table assembly may further comprise an actuator configured to slide the carrier in the recess.

The stowable table assembly may further comprise one or more cables extending from the carrier to the table portion. The cables may pass through the elongate members. For example, one or more upper cables pass through the elongate members at or adjacent to the upper surface of the elongate members, e.g. such that the upper cables may be in tension when the table portion is in the deployed position. One or more lower cables may pass through the elongate members at or adjacent to the underside surface of the elongate members, e.g. such that the lower cables may limit the movement of the table portion beyond the stowed position.

The elongate members may be rotatably coupled to one another, e.g. at or adjacent to the upper surface of the elongate members. For example, the elongate members may be rotatably coupled to one another by virtue of a living hinge.

Alternatively, the rotatable coupling may be achieved by a connection spaced apart from the upper surface. For example, the elongate members may comprise one or more arms that extend from one of the side surfaces. The arms may be slidably received in one or more corresponding slots that may be provided in the neighbouring elongate member. The arms and slots may be curved. The arms and slots may be curved with a centre of curvature that may be substantially coincident with an edge of the upper surface of the respective elongate member.

Each of the arms may comprise a lug provided at an end of the arm. The lug may be configured to engage an abutment shoulder in the slot. An interaction between the lug and abutment shoulder may limit movement of the neighbouring tapered surfaces away from one another.

The elongate members may be coupled to one another such that the side surfaces of neighbouring elongate members face each other. Neighbouring edges of the upper surface of neighbouring elongate members may abut in the stowed and deployed positions. By contrast, neighbouring edges of the underside surface of neighbouring elongate members may be spaced apart in the stowed position and may abut in the deployed position.

The upper surface of the elongate members may be curved. A curvature of the upper surfaces of the elongate members may be continuous across neighbouring elongate members, e.g. so that in the deployed position the upper surfaces of the elongate members may form a smooth curve.

Each of the elongate members may have a tile applied to the underside surface of the elongate member. The tile of a particular elongate member may be configured to overlap a neighbouring elongate member when the table portion is in the stowed position.

A stretchable membrane may be applied to and extend across the underside surfaces of the elongate members.

A flexible material, e.g. leather, may extend over the upper surface of the elongate members.

One or more of the elongate members may comprise a slot for receiving a writing implement, e.g. pen, pencil, stylus etc.

The carrier may be configured to substantially remain in the recess when the table portion is in the deployed position.

A vehicle may comprise the above-mentioned stowable table assembly. A trim portion of a vehicle, such as a motor vehicle, may comprise the recess.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
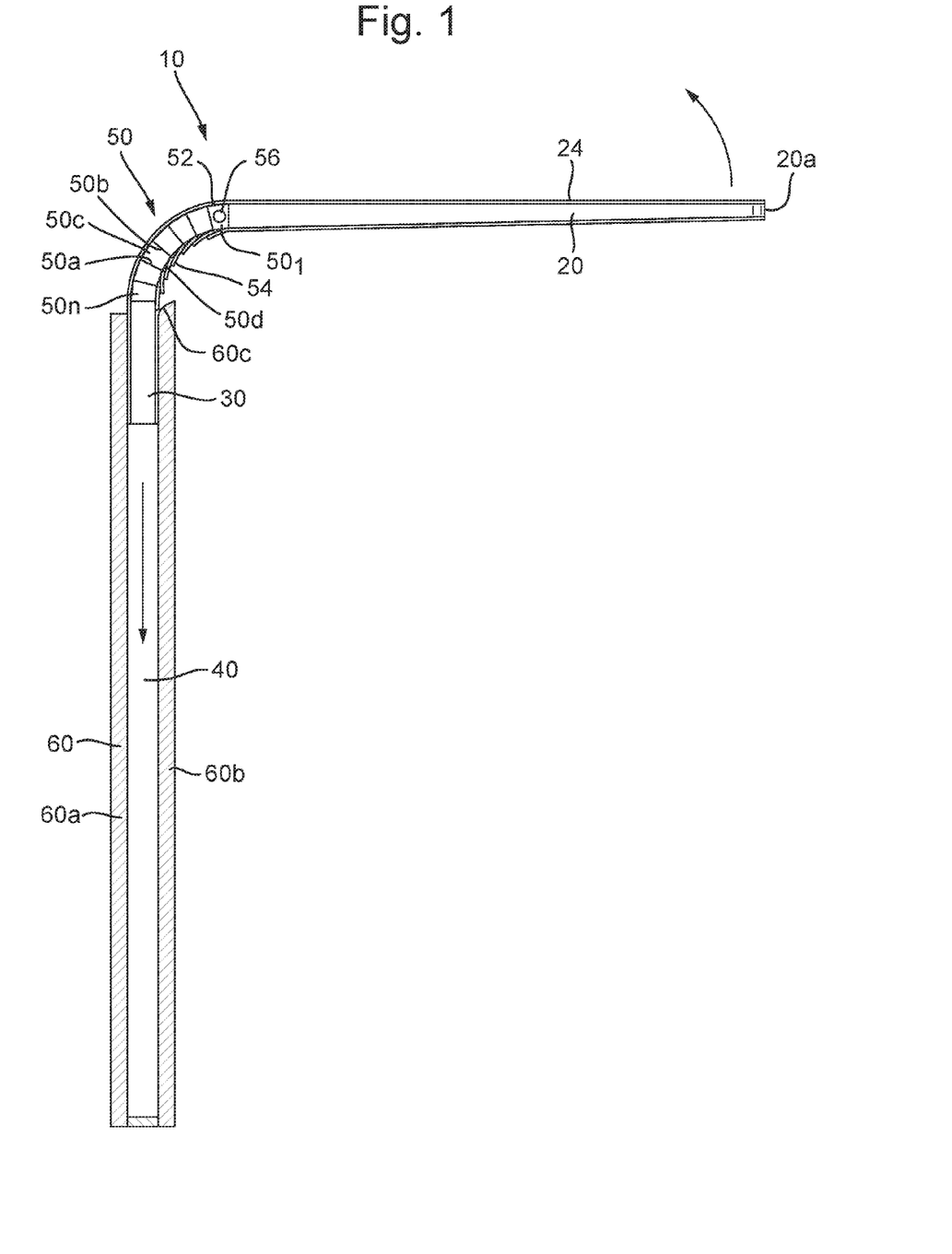
FIG. 1 is a schematic side view of a stowable table assembly according to an arrangement of the present disclosure.
Figure 2:
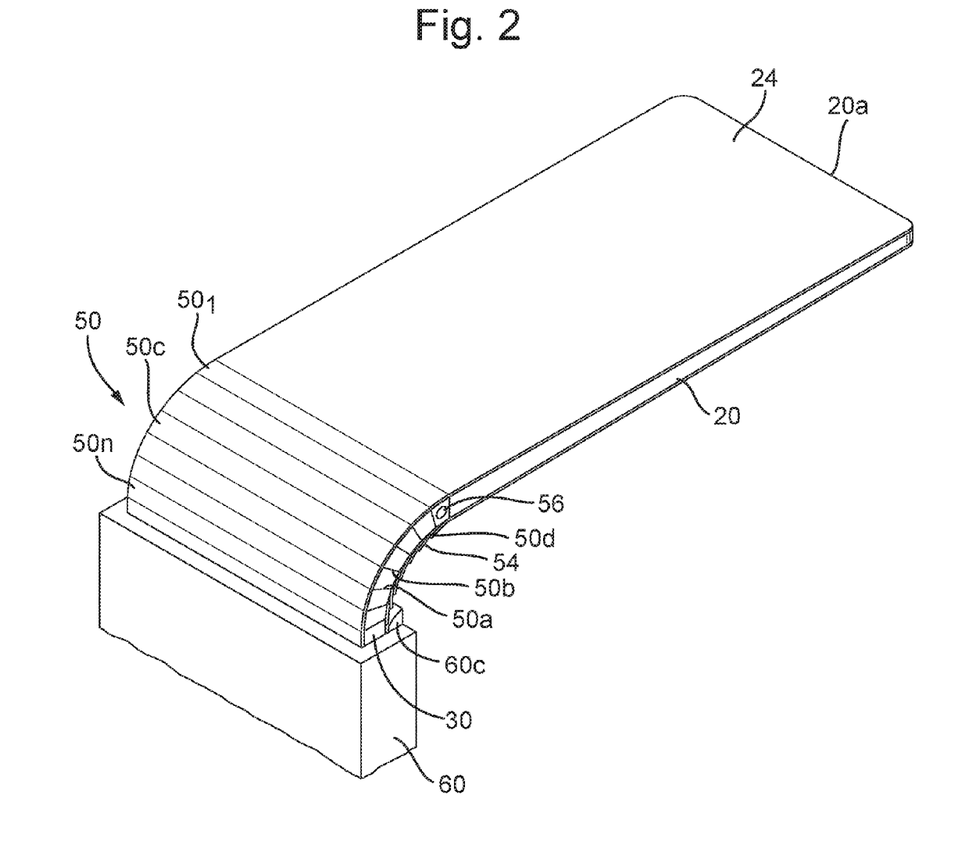
FIG. 2 is a perspective view of the stowable table assembly according to an arrangement of the present disclosure.

With reference to FIGS. 1 and 2, a stowable table 10 according to an arrangement of the present disclosure is shown. The stowable table 10 comprises a table portion 20, which may move between a deployed position, in which the table portion 20 may be substantially horizontal, to a stowed position, in which the table portion 20 may be non-horizontal, e.g., substantially vertical. FIGS. 1 and 2 depict the table portion 20 in the deployed configuration, whereas FIG. 5c, which will be described in further detail below, shows the table portion 20 in the stowed configuration. It will be appreciated that the table portion 20 may be substantially planar and may comprise a top surface 24 upon which items may be placed.

The stowable table 10 further comprises a carrier 30, which may be slidably received in a recess 40. The recess 40 may receive the stowable table 10 when in the stowed position. The stowable table 10 also comprises a plurality of elongate wedge shaped members 50 which are provided between the table portion 20 and the carrier 30. The wedge shaped members 50 are successively interconnected to one another with a first wedge shaped member $50_1$ connected to the table portion 20 and a last wedge shaped member $50_n$ connected to the carrier 30. The wedge shaped members 50 are elongate and are arranged side by side with side surfaces 50a, 50b that are adjacent to a neighbouring wedge shaped member. The wedge shaped members 50 have a wedge shaped cross-section such that the side surfaces 50a, 50b of a particular wedge shaped member 50 taper towards each other from an upper surface 50c of the wedge shaped member to an underside surface 50d of the wedge shaped member. Accordingly, the upper surface 50c may be wider than the underside surface 50d. The wedge shaped member 50 may thus resemble the voussoir of an arch. The extent of the taper and the number of the wedge shaped members 50 may be selected according to the desired difference in angle of the table portion between the stowed and deployed positions.

The wedge shaped members 50 are rotatably coupled to one another. The rotatable coupling may be such that the side surfaces 50a, 50b of neighbouring wedge shaped members abut when the table portion 20 is in the deployed position and the side surfaces 50a, 50b may move apart when the table portion is moved into the stowed position. Neighbouring wedge shaped members 50 may rotate about a point 51 where the upper surfaces 50c of the neighbouring wedge shaped members meet. The first and last wedge shaped members $50_1$, $50_n$ may be similarly connected to the table portion 20 and carrier 30 respectively.

Figure 4A:
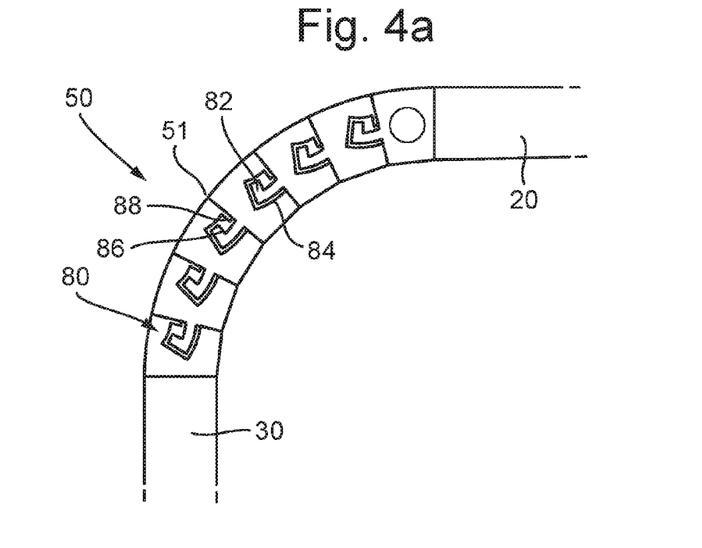
FIGS. 4a and 4b are partial side sectional views of the stowable table assembly according to an arrangement of the present disclosure with FIG. 4a corresponding to a horizontal deployed position and FIG. 4b corresponding to a vertical stowed position.
Figure 4B:
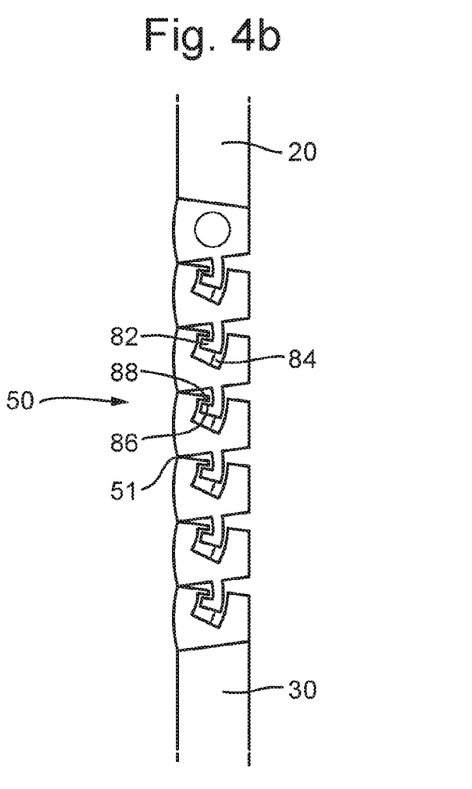

The wedge shaped members 50 may be pivotally connected to one another by virtue of a mechanical pivot at the interface between neighbouring upper surfaces 50c. The pivot may be formed by, for example, a living hinge in which the wedge shaped members are integrally connected at the pivot point 51. Alternatively, the wedge shaped members 50 may be pivotally connected by virtue of a flexible material that extends over the upper surfaces 50c of the wedge shaped members. The flexible material may also extend over the upper surface 24 of the table portion 20. The wedge shaped members may be affixed to the flexible material, but may or may not otherwise be connected to one another. The flexible material may for example be a leather or leather type of material. In an alternative arrangement, which will be described in more detail with reference to FIG. 4 below, the wedge shaped members 50 may be connected to one another by virtue of a mechanical coupling spaced apart from the pivot point 51 at the interface between neighbouring upper surfaces 50c.

The underside surfaces 50d of the wedge shaped members 50 may each comprise a tile 54 that extends along the length of the wedge shaped member. The tiles 54 may be wider than the underside surface 50d so that the tile 54 overlaps with a neighbouring wedge shaped member underside surface 50d. The overlap may be sufficient such that when the table portion is in the stowed position, a gap between the neighbouring wedge members is covered by the tile 54. In this way the tiles 54 may resemble armadillo skin.

In an alternative arrangement, instead of the tiles 54, a stretchable membrane may be applied to and extend across the underside surfaces 50d of the wedge shaped members. The stretchable membrane may stretch as the wedge shaped members uncurl into the stowed position.

As is shown in FIGS. 1 and 2, one or more of the wedge shaped members 50 may comprise a slot 56 for receiving a writing implement, such as a pen, stylus or any other elongate implement. As depicted, the slot 56 may have a circular opening. The wedge shaped member 50 may comprise a mechanism configured to latch the writing implement into a locked position. The writing implement may be released from the slot 56 by pressing an end of the writing implement at the opening to the slot 56.

The upper surfaces 50c of the wedge shaped members may be curved. The curvature of the upper surfaces 50c may be such that when the table portion 20 is in the deployed position, the curvature of the wedge shaped members from the carrier 30 to the table portion 20 is smooth and continuous. For example, the gradient of the curvature on the upper surfaces 50c may be equal to the gradient of the curvature on a neighbouring upper surface 50c where the upper surface neighbouring wedge shaped members meet and when the table portion is in the deployed position.

The recess 40 may be provided in a receiving structure 60. The receiving structure may comprise first and second side walls 60a, 60b disposed either side of the carrier 30. The carrier 30 may be slidably received in the receiving structure 60. As will be described in more detail with respect to FIGS. 6 and 7 below, an actuator may be provided to selectively slide the carrier 30 in the recess 40. The carrier 30 may remain in the recess 40 of the receiving structure 60 when the table portion 20 is in the deployed and stowed positions. The recess 40 may be sized to accommodate the carrier 30, wedge shaped members 50 and table portion 20. In the stowed position a distal end 20a of the table portion 20 may be flush with an opening to the recess 40. The receiving structure 60 may form part of a vehicle, in particular a motor vehicle, and the receiving structure 60 may be part of a vehicle interior trim.

An edge 60c of the recess opening that faces the underside 50d of the wedge shaped members 50 may be curved and/or formed from a low friction material. Alternatively, the edge 60c of the recess opening that faces the undersides 50d may comprise a roller. In either case, friction between the receiving structure 60 and the underside of the wedge shaped members 50 may be reduced.

Figure 3A:
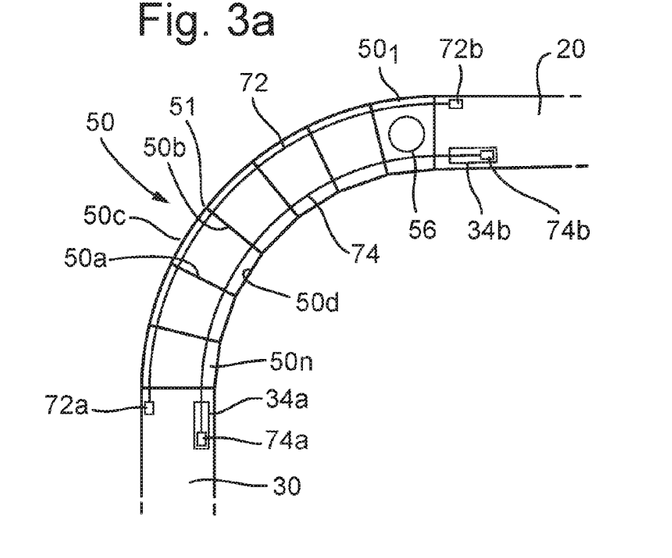
FIGS. 3a and 3b are partial side sectional views of the stowable table assembly according to an arrangement of the present disclosure with FIG. 3a corresponding to a horizontal deployed position and FIG. 3b corresponding to a vertical stowed position.
Figure 3B:
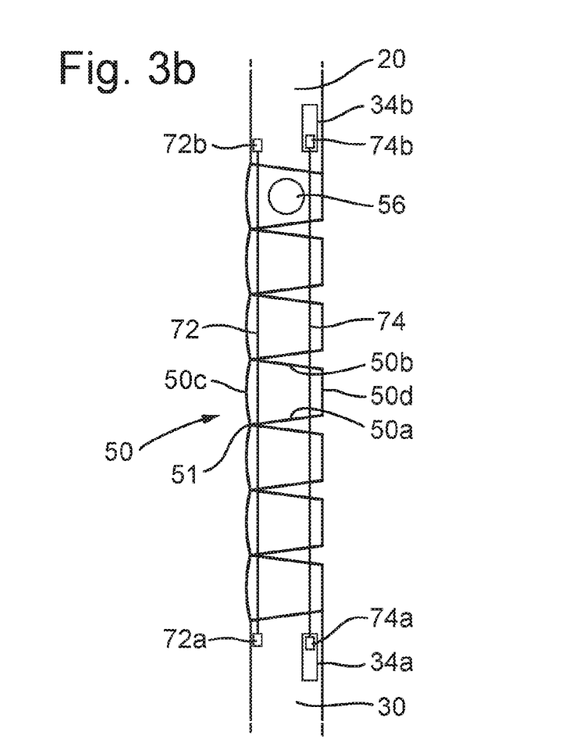

Referring now to FIGS. 3a and 3b, the stowable table 10 may further comprise one or more cables extending from the carrier 30 to the table portion 20. The cables may pass through the wedge shaped members 50 and may assist in supporting the table portion 20. For example, one or more first cables 72 may pass through the wedge shaped members at or near the upper surfaces 50c of the wedge shaped members. The first cable 72 may be in tension when the table portion 20 is in the deployed position, e.g., as depicted in FIG. 3a. Ends of the first cable 72 may be secured to the carrier 30 and table portion 20. For example, lugs 72a, 72b at the ends of the first cable 72 may be received in corresponding recesses in the carrier 30 and table portion 20 respectively. The length of the first cable 72 may be selected so that the first cable 72 is in tension when the table portion is in the deployed position. Channels may be provided in the wedge shaped members that are perpendicular to a longitudinal axis of the wedge shaped members for the first cables to pass through. The first cable 72 may pass through or close to the pivot points 51 between neighbouring wedge shaped members 50. In the case of there being more than one first cable 72, the cables 72 may be spaced apart along the length of the wedge shaped members.

The stowable table 10 may also comprise one or more second cables 74 which extend from the carrier 30 to the table portion 20. The second cable 74 may pass through the wedge shaped members 50 at or adjacent to the underside surfaces 50d of the wedge shaped members. The second cables 74 may be configured such that they are in tension when the table portion 20 is in the stowed position, e.g., as depicted in FIG. 3b. The second cables 74 may thus prevent the table portion 20 from rotating further beyond the stowed position. The second cable 74 may not therefore be in tension when the table portion 20 is in the deployed position. Ends of the second cable 74 may be provided with lugs 74a, 74b, which may be received in recesses 34a, 34b in the carrier 30 and table portion 20 respectively. The recesses 34a, 34b may permit the lugs 74a, 74b to slide so that any slack in the second cable 74 can be accommodated when the table portion 20 is in the deployed position. It will be appreciated that one or both of the lugs 74a, 74b may be slidably received in its corresponding recess. Channels may be provided in the wedge shaped members that are perpendicular to the longitudinal axis of the wedge shaped members for the second cables to pass through. In the case of there being more than one second cable 74, the cables 74 may be spaced apart along the length of the wedge shaped members.

With reference to FIGS. 4a and 4b, the stowable table 10 may comprise an interlocking structure 80 in addition to or instead of the cables mentioned above. The interlocking structure 80 may comprise an arm 82 that extends from one of the side surfaces 50a, 50b of a particular wedge shaped member. The facing side surface 50a, 50b of the neighbouring wedge shaped member may comprise a slot 84 that is shaped to receive the arm 82 of the neighbouring wedge shaped member 50. The arm 82 and slot 84 may be configured to permit the neighbouring wedge shaped members 50 to move relative to one another in the manner described above. In particular, the arm 82 may slide in the slot 84. The arm 82 and slot 84 may be curved with the same curvature so that the neighbouring wedge shaped members may rotate with respect to one another. The curvature of the arm and slot 82, 84 may be centred on the point 51 between the upper surfaces 50c of the neighbouring wedge shaped members 50. As the arm 82 slides in the corresponding slot 84 the adjacent wedge shaped members may rotate relative to one another. Each of the interfaces between neighbouring wedge shaped members 50 may be provided with such arms 82 and slots 84. Accordingly, the wedge shaped members 50 may move from the deployed position in which the side surfaces 50a, 50b are in abutment (as shown in FIG. 4a) to the stowed position in which the side surfaces 50a, 50b are spaced apart (as shown in FIG. 4b).

Each of the arms 82 may comprise a lug 86 provided at an end of the arm. The lug 86 may be wider than the remainder of the arm 82. The lug 86 may engage an abutment shoulder 88 in the slot 84. The abutment shoulder 88 may be formed by a wider portion of the slot 84. An interaction between the lug 86 and abutment shoulder 88 may restrict movement of the neighbouring wedge shaped members away from one another. The arms 82 and slot 84 may be sized so that there is a close fit between the arms 82 and slot 84. Such a close fit may help to prevent unwanted movements between wedge shaped members.

Figure 5A:
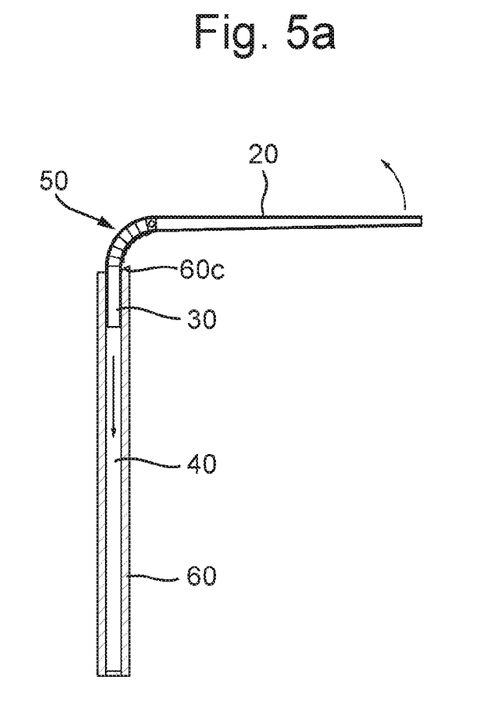
FIGS. 5a, 5b and 5c are schematic side views of the stowable table assembly according to an arrangement of the present disclosure with FIG. 5a showing the table in a horizontal deployed position, FIG. 5b showing the table in an intermediate position, and FIG. 5c showing the table in a stowed position.
Figure 5B:
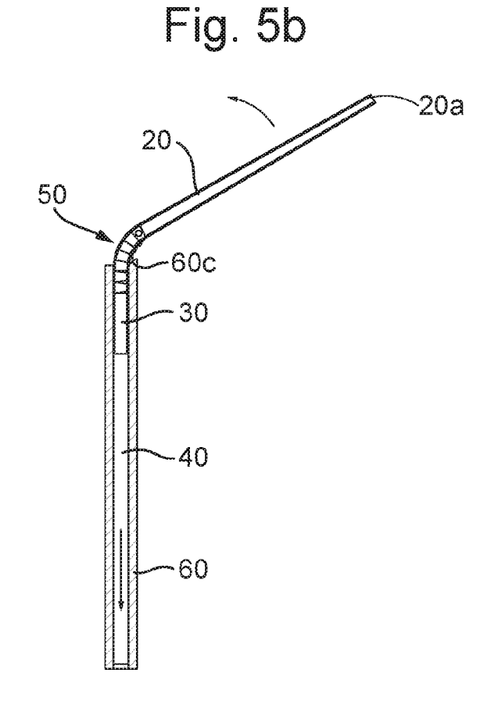
Figure 5C:
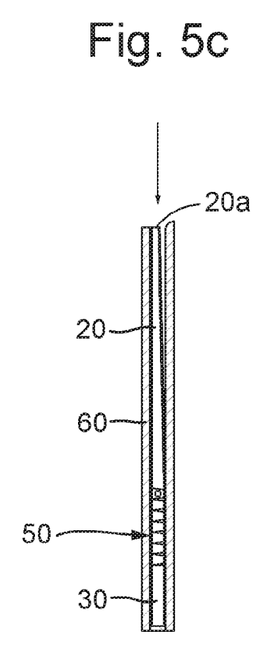

Referring now to FIGS. 5a, 5b and 5c, operation of the stowable table 10 will now be described. FIG. 5a depicts the stowable table 10 in the deployed position in which the wedge shaped members 50 and table portion 20 are outside the recess 40. The wedge shaped members 50 form a partial arch with the side surfaces 50a, 50b of adjacent wedge shaped members in abutment. The table portion 20 is substantially horizontal (or may be at another desired angle). The wedge shaped members 50 and table portion together form a cantilever extending from the receiving structure 60. The carrier 30 is substantially located inside the recess 40. When the stowable table is required to be stowed, the carrier portion 30 may be lowered further into the recess 40. As the carrier 30 lowers the underside 50d of the wedge shaped portions interacts with the edge 60c of the receiving structure 60. As the wedge shaped members 50 interact with the edge 60c of the receiving structure, the wedge shaped members are successively urged out of abutment with each other. As the carrier 30 lowers further, the wedge shaped members 50 are successively drawn into the recess 40 and the edge 60c of the receiving structure interacts with subsequent wedge shaped members 50. The table portion 20 is moved away from the deployed position and is rotated towards the stowed position. FIG. 5b shows an intermediate position for the stowable table 10.

As shown in FIG. 5c, once the carrier 30 has been lowered all the way into the recess 40 the wedge shaped members and the table portion 20 may all reside in the recess 40. The distal end 20a of the table portion 20 may be flush with the top edge of the receiving structure 60.

In a similar manner the table may be moved from the stowed position to the deployed position by raising the carrier 30 in the recess 40. The stowable table 10 may be disposed at an angle, e.g., a small angle, away from the vertical direction so that as the stowable table is deployed gravity acts on the table portion 20 to initially cause the table portion to rotate from the stowed position to the deployed position.

Figure 6A:
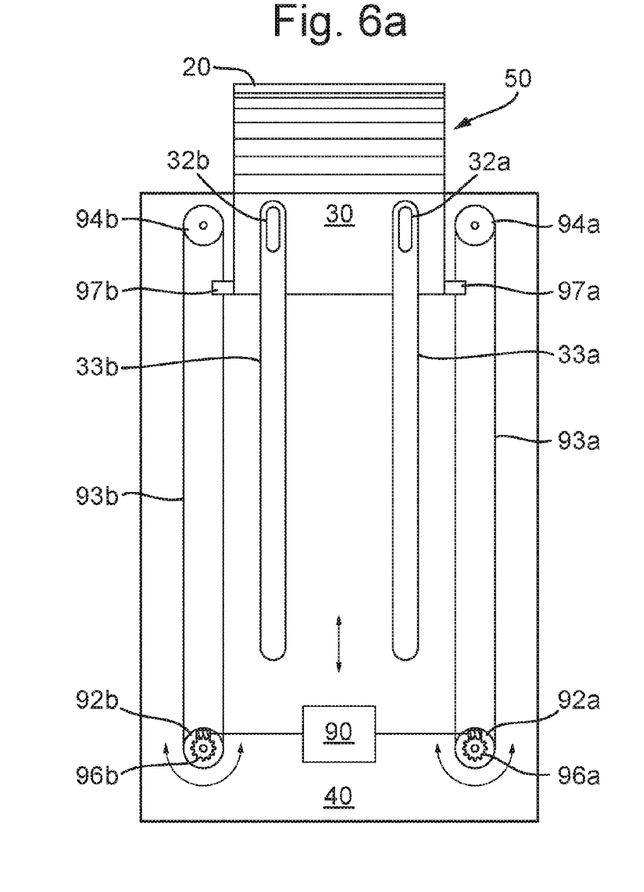
FIGS. 6a and 6b are schematic end views of the stowable table assembly according to an arrangement of the present disclosure with FIG. 6a corresponding to a deployed position and FIG. 6b corresponding to a stowed position.
Figure 6B:
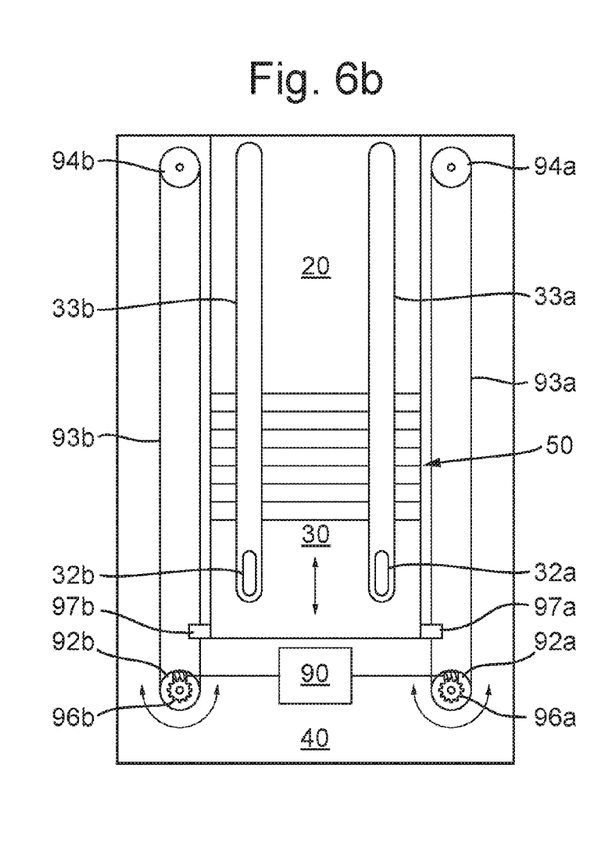

Referring now to FIGS. 6a and 6b, movement of the carrier 30 may be driven by an actuator, e.g., in the form of a motor 90. The motor 90 may be operatively connected to the carrier 30 by virtue of a pulley mechanism. For example, the motor 90 may drive pulleys 92a, 92b by virtue of gears 96a, 96b respectively. The pulleys 92a, 92b may in turn drive belts 93a, 93b, which pass round further pulleys 94a, 94b. The belts 93a, 93b may be connected to the carrier 30 via connecting portions 97a, 97b respectively. Rotation of the pulleys driven by the motor 90 may thus cause the carrier 30 to displace linearly within the recess 40. The carrier 30 can thus be moved up or down in the recess 40 depending on the direction of rotation of the motor 90. The carrier 30 may comprise one or more guides 32a, 32b, which are received in respective channels 33a, 33b in the receiving structure 60. The guides 32a, 32b and channels 33a, 33b constrain the carrier 30 to move in a linear direction within the recess 40.

Figure 7A:
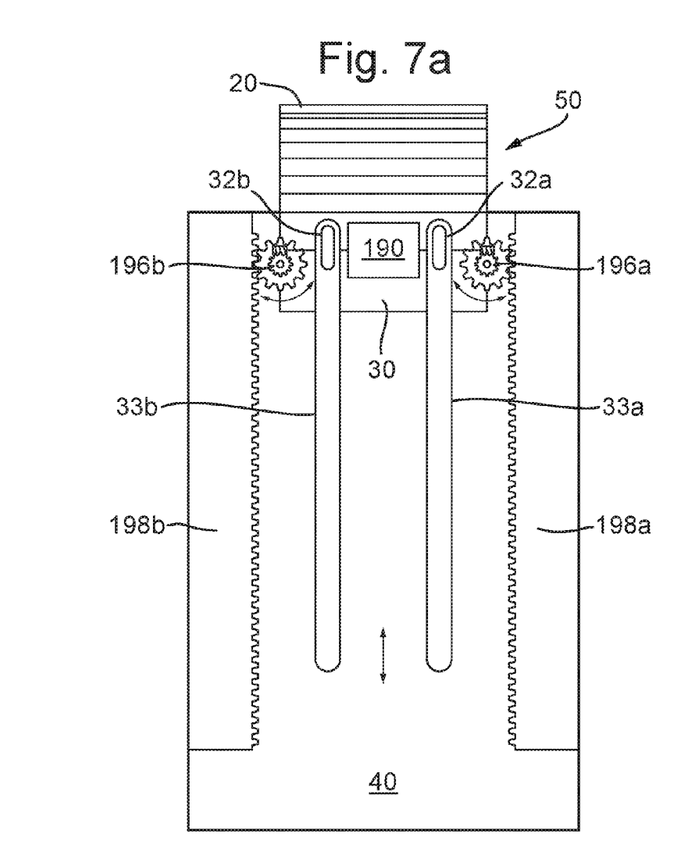
FIGS. 7a and 7b are schematic end views of the stowable table assembly according to an arrangement of the present disclosure with FIG. 7a corresponding to a deployed position and FIG. 7b corresponding to a stowed position.
Figure 7B:
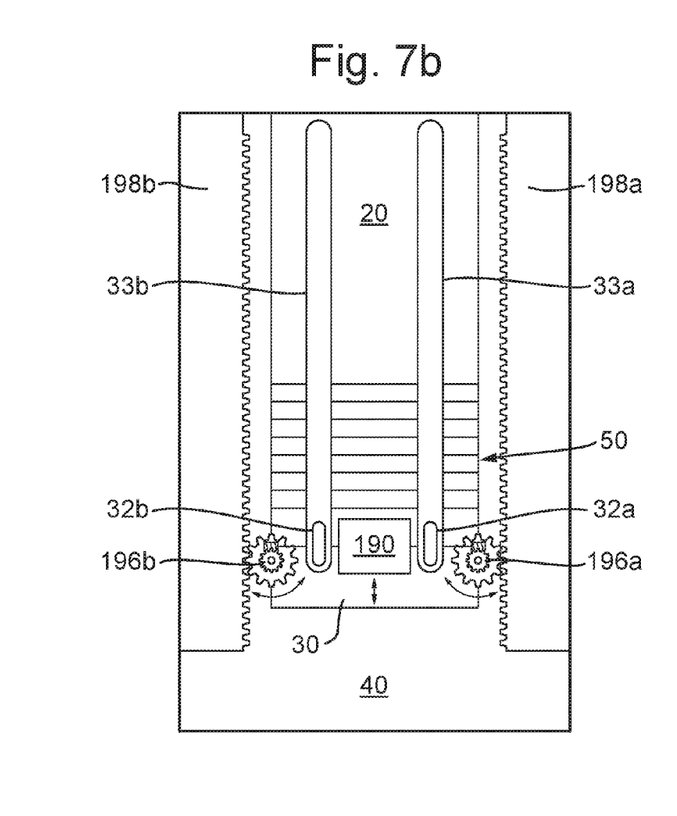

As depicted in FIGS. 6a and 6b, the actuator may be provided in the recess 40. However, in an alternative arrangement, the actuator may be provided on the carrier 30. The actuator on the carrier 30 may engage a pulley system, e.g., like that depicted in FIGS. 6a and 6b. Alternatively, the actuator provided on the carrier 30 may engage a rack and pinion type system as depicted in FIGS. 7a and 7b. For example, motor 190 provided on carrier 30 may drive pinion gears 196a, 196b, which are rotatably coupled to the carrier 30. The pinion gears 196a, 196b respectively engage rack portions 198a, 198b, which are provided in the receiving structure 60. As the motor 190 drives the pinion gears 196a, 196b the pinion gears move up or down on the racks 198a, 198b and thereby slidably move the carrier 30 in the recess 40. A similar rack and pinion type arrangement could be used in the example of FIGS. 6a and 6b in which the actuator is provided in the recess 40.

A controller may be provided to selectively actuate the actuator to either move the carrier 30 up or down within the recess 40 and thus deploy or stow the table portion 20. The controller may be operatively coupled to a switch or control device which a user may use to deploy or stow the table portion 20.

Although the table portion 20 is shown deployed as a cantilever, it will be appreciated that the distal end 20a of the table portion 20 may abut a support member when the table portion is in the deployed position. This may be advantageous in cases where the table portion 20 is particularly long or the likely forces to be encountered are high.

Furthermore, although not shown, the table portion may comprise a rotatable cup holder that is configured to remain in an upright position regardless of the angle of the table portion, e.g., by virtue of a weighted portion below a rotation axis. The gradual rotation of the table portion 20 thanks to the wedge shaped members may beneficially reduce oscillations in the cup holder as the table portion rotates.

It will be appreciated by those skilled in the art that although the stowable table assembly has been described by way of example, with reference to one or more examples, it is not limited to the disclosed examples and alternative examples may be constructed without departing from the scope defined by the appended claims.

The invention claimed is:

1. A stowable table assembly comprising:
   a table portion rotatable between a deployed position and a stowed position;
   a carrier configured to be slidably received in a recess; and
   a plurality of elongate members provided between the table portion and the carrier, each of the elongate members having a wedge-shaped cross-section such that the elongate members include side surfaces that taper towards each other from an upper surface to an underside surface of the elongate members, a first elongate member being coupled to the table portion and a last elongate member being coupled to the carrier,
   wherein the elongate members are movably coupled to one another such that the side surfaces of neighbouring elongate members abut when the table portion is in the deployed position.

2. The stowable table assembly of claim 1, wherein an interaction between an edge of a recess opening and the underside surfaces of the elongate members causes the table portion to move from the deployed position to the stowed position as the carrier is retracted into the recess.

3. The stowable table assembly of claim 2, wherein the stowable table assembly further comprises an actuator configured to slide the carrier in the recess.

4. The stowable table assembly of claim 3, wherein the stowable table assembly further comprises one or more cables extending from the carrier to the table portion and passing through the elongate members.

5. The stowable table assembly of claim 4, wherein one or more upper cables pass through the elongate members at or adjacent to the upper surface of the elongate members such that the upper cables are in tension when the table portion is in the deployed position.

6. The stowable table assembly of claim 5, wherein one or more lower cables pass through the elongate members at or adjacent to the underside surface of the elongate members such that the lower cables limit movement of the table portion beyond the stowed position.

7. The stowable table assembly of claim 6, wherein the elongate members are rotatably coupled to one another.

8. The stowable table assembly of claim 7, wherein the elongate members comprise one or more arms that extend from one of the side surfaces, the arms being slidably received in one or more corresponding slots provided in a neighbouring elongate member.

9. The stowable table assembly of claim 8, wherein the arms and slots are curved.

10. The stowable table assembly of claim 9, wherein the arms and slots are curved with a centre of curvature that is substantially coincident with a second edge of the upper surface of the respective elongate member.

11. The stowable table assembly of claim 8, wherein each arm comprises a lug provided at an end of the arm, the lug configured to engage an abutment shoulder in one of the slots, wherein a second interaction between the lug and abutment shoulder limits movement of neighbouring tapered surfaces away from one another.

12. The stowable table assembly of claim 11, wherein neighbouring edges of upper surfaces of neighbouring elongate members abut in the stowed position and deployed position.

13. The stowable table assembly of claim 12, wherein neighbouring edges of underside surfaces of neighbouring elongate members are spaced apart in the stowed position.

14. The stowable table assembly of claim 13, wherein the upper surface of the elongate members is curved.

15. The stowable table assembly of claim 14, wherein a curvature of the upper surfaces of the elongate members is continuous across neighbouring elongate members.

16. The stowable table assembly of claim 15, wherein each of the elongate members has a tile applied to the underside surface of each of the elongate members, the tile of a particular elongate member being configured to overlap a neighbouring elongate member when the table portion is in the stowed position.

17. The stowable table assembly of claim 16, wherein a stretchable membrane is applied to and extends across the underside surface of the elongate members.

18. The stowable table assembly of claim 17, wherein a flexible material extends over the upper surface of the elongate members.

19. The stowable table assembly of claim 1, wherein one or more of the elongate members comprises a slot for receiving a writing implement.

20. A stowable table assembly comprising:
a table portion rotatable between a deployed position and a stowed position;
a carrier configured to be slidably received in a recess; and
a plurality of elongate members provided between the table portion and the carrier, each of the elongate members having a wedge-shaped cross-section such that the elongate members include side surfaces that taper towards each other from an upper surface to an underside surface of the elongate members, a first elongate member being coupled to the table portion and a last elongate member being coupled to the carrier,
wherein the elongate members are movably coupled to one another such that the side surfaces of neighbouring elongate members abut when the table portion is in the deployed position, wherein an interaction between an edge of a recess opening and the underside surfaces of the elongate members causes the table portion to move from the deployed position to the stowed position as the carrier is retracted into the recess, and wherein the edge of the recess opening is formed from a low friction material.

* * * * *